United States Patent [19]

Elgal

[11] Patent Number: 5,663,475
[45] Date of Patent: Sep. 2, 1997

[54] REACTOR FOR OXIDATION OF PETROCHEMICALS USING OZONE AND HYDROGEN PEROXIDE

[75] Inventor: Galoust M. Elgal, Sacramento, Calif.

[73] Assignee: The United States of America as represented by the Secretary of the Air Force, Washington, D.C.

[21] Appl. No.: 297,345

[22] Filed: Aug. 26, 1994

[51] Int. Cl.$^6$ .......................... A62B 9/00; B01D 37/00; B01D 43/00
[52] U.S. Cl. .......................... 588/205; 588/206; 588/213; 210/750; 210/759; 210/760; 210/908
[58] Field of Search .......................... 588/205, 206, 588/207, 209, 213, 218, 242, 246; 405/128, 129, 263; 210/750, 759, 760, 908

[56] References Cited

U.S. PATENT DOCUMENTS

| | | | |
|---|---|---|---|
| 3,460,901 | 8/1969 | Massa et al. | 23/2 |
| 3,848,548 | 11/1974 | Bolejack, Jr. et al. | 110/7 R |
| 4,347,225 | 8/1982 | Audeh et al. | 423/207 |
| 4,661,179 | 4/1987 | Hunter et al. | 149/124 |
| 4,849,114 | 7/1989 | Zeff et al. | 210/760 |
| 4,892,664 | 1/1990 | Miller | 210/747 |
| 5,043,080 | 8/1991 | Cater et al. | 210/909 |
| 5,232,484 | 8/1993 | Pignatello | 588/206 |
| 5,273,664 | 12/1993 | Schulz | 210/759 |
| 5,352,335 | 10/1994 | Beaver | 203/11 |
| 5,364,537 | 11/1994 | Paillard | 210/760 |
| 5,375,539 | 12/1994 | Rippberger | 588/213 |
| 5,427,693 | 6/1995 | Mausgrover et al. | 210/759 |
| 5,463,170 | 10/1995 | von Wedel | 588/207 |
| 5,478,481 | 12/1995 | Kazama et al. | 210/759 |

FOREIGN PATENT DOCUMENTS

| | | | |
|---|---|---|---|
| 4135905 | 5/1993 | Germany | 588/206 |
| 4216776 | 11/1993 | Germany | 588/207 |
| 4224259 | 1/1994 | Germany | 588/205 |
| 55-22320 | 2/1980 | Japan | 423/224 |
| 3-4918 | 1/1991 | Japan | 586/218 |

OTHER PUBLICATIONS

Noonan et al, Enhanced Performance of Soil Vapor Extraction, Chemical Engineering Progress Jun. 93, pp. 55–61.

Primary Examiner—Gary P. Straub
Attorney, Agent, or Firm—Thomas C. Stover

[57] ABSTRACT

In place of the incinerator in the present GWTPs, the following is substituted therein: a first reactor treats the vapor phase of the gases being expelled out of the air stripper. These vapors contain gases of volatile contaminants. The vapors are mixed with ozone and pumped into the first reactor where they are further scrubbed and oxidized in a packed column in contact with high concentration hydrogen peroxide. The hydrogen peroxide flows downward through the packing column while the Ozone mixture is fed from the bottom. The combined effect of ozone and hydrogen peroxide serves as a powerful oxidizing medium. The hydrogen peroxide accumulated at the bottom is pumped to the top in a recirculation process to be reused. The hydrogen peroxide can be increased to high concentrations, such as 30%, and recirculated for optimum usage. The second reactor is designed for the water, that is, for liquid phase treatment. The water expelled from the bottom of the air stripper is pumped into an ozone and hydrogen peroxide reactor where ozone gas is bubbled into the reactor together with low concentration hydrogen peroxide in order to decompose and oxidize the contaminants in the water. For low concentration contamination, such as 5 ppm, it may be possible to eliminate hydrogen peroxide and use ozone only. In this scheme a powerful water treatment system is not needed because the air stripper has already done a major part of the work and only a low energy system is sufficient.

4 Claims, 2 Drawing Sheets

REACTOR FOR OXIDATION OF PETROCHEMICALS USING OZONE AND HYDROGEN PEROXIDE

STATEMENT OF GOVERNMENT INTEREST

The invention described herein may be manufactured and used by or for the Government for governmental purposes without the payment of any royalty thereon.

FIELD OF THE INVENTION

The field of this invention is environmental contamination management and remediation. In particular it has to do with petrochemical contaminant treatment and remediation.

BACKGROUND OF THE INVENTION

In the past, Government installations, in particular, military bases, for example, have had Ground Water Treatment Plants (GWTP). Common to this type of plants which are installed at numerous other facilities and industrial operations is the use of incinerators to burn the petrochemical contaminants after they have been separated from the ground water. The combustion process is energy intensive and uses natural gas and contributes to the pollution of the atmosphere by expelling carbon dioxide and nitrogen oxides. One alternate means is the use of catalysts which are expensive and subject to poisoning and without added gas scrubbers they pollute the atmosphere. Efforts have been in progress for technology improvements and alternatives, however, these efforts have been directed into very intensive and sophisticated treatment processes.

SUMMARY OF THE INVENTION

In place of the incinerator in the present GWTPs, the following is substituted therein: an air stripper for stripping petrochemical contaminants from water and a vapor reactor which treats the vapor phase of the gases being expelled out of the air stripper. These vapors contain gases of volatile contaminants. The vapors are mixed with ozone and pumped into the vapor reactor where they are scrubbed and oxidized in a packed column in contact with high concentration hydrogen peroxide. The hydrogen peroxide flows downward through the packing column while the Ozone mixture is fed from the bottom. The combined effect of ozone and hydrogen peroxide serves as a powerful oxidizing medium. The hydrogen peroxide accumulated at the bottom is pumped to the top in a recirculation process to be reused. The hydrogen peroxide can be increased to high concentrations, such as 30%, and recirculated for optimum usage. Also provided is a second reactor, i.e. a water reactor designed for treatment of the water purified in the above air stripper. The water expelled from the bottom of the air stripper is pumped into an ozone and hydrogen peroxide reactor where ozone gas is bubbled into the reactor together with low concentration hydrogen peroxide in order to decompose and oxidize at least some of any contaminants remaining in the water. For low concentration contamination, such as 5 ppm, it may be possible to eliminate hydrogen peroxide and use ozone only. In this scheme a powerful water treatment system is not needed because the air stripper has already done a major part of the work and only a low energy system is sufficient.

Therefore, one object of the present invention is to provide a process of treating ground water contamination with petrochemicals.

Another object of the present invention is to provide a process that does not use an incinerator.

Another object of the present invention is to provide a process which treats the vapor and water separately.

Another object of the present invention is to provide a process that uses concentrated oxidizers that are cheap and readily available.

Another object of the present invention is to provide a process where intensive water treatment may not be required.

Another object of the present invention is to provide a process that uses an air stripper in combination with vapor and water treatment.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENTS

Figure 1:
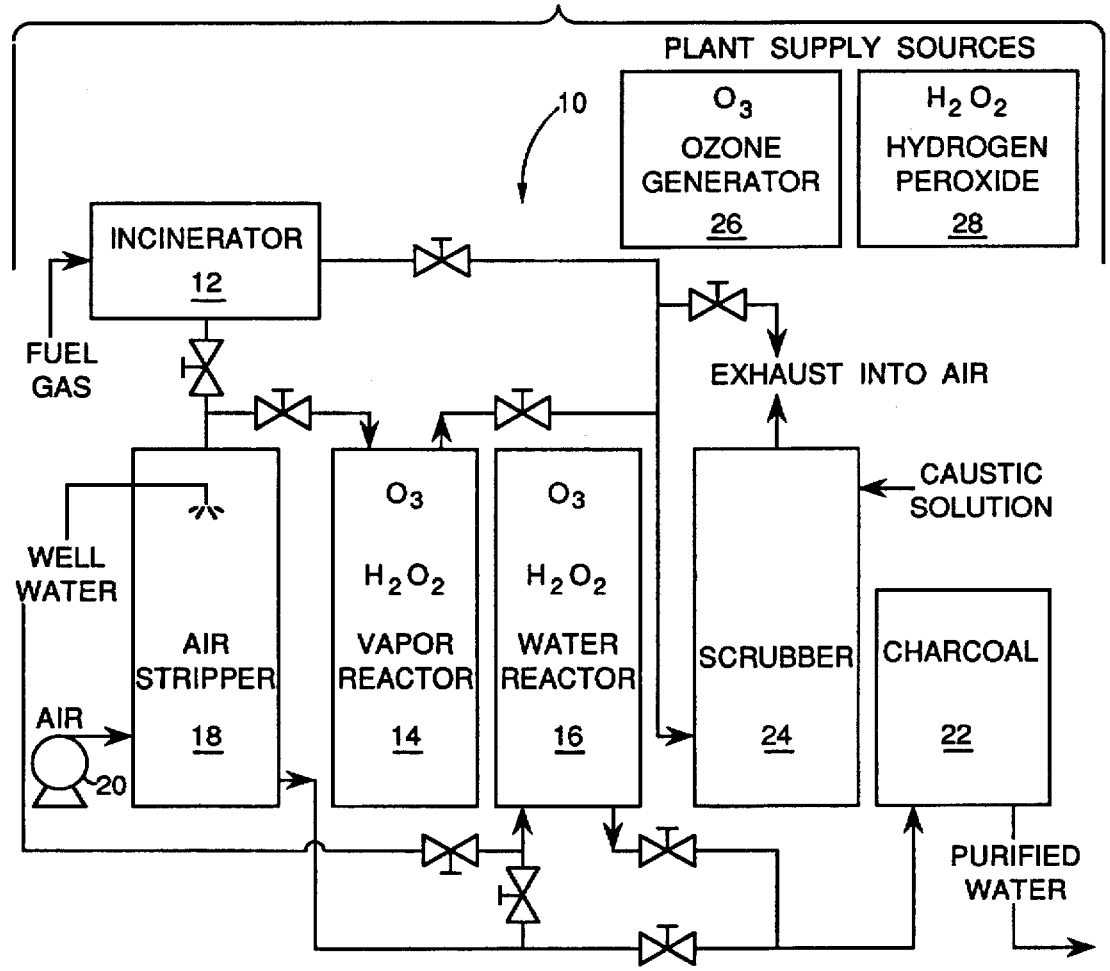
FIG. 1 is a schematic of the present invention.

Referring to FIG. 1, a ground water treatment apparatus 10 is shown. An incinerator 12 is shown, but is not required in the present apparatus or process. The incinerator 12 uses a petroleum non-renewable fuel resource, uses costly to maintain hot gas system, and exhausts pollutants such as carbon dioxide and nitric oxides into the air. Furthermore, all plants of similar design would not need to be completely abandoned just because of the incinerator 12, but the incinerator 12 would be deactivated and the present invention placed thereabout.

FIG. 1 shows a vapor reactor 14 and water reactor 16 connected to an air stripper 18 which separates the petrochemicals, to a very substantial degree, from the separated water. A typical air stripper adapted to the environmental pollution treatment would be a tall column where water containing petroleum products as contaminant is sprayed from the top and simultaneously air is blown in from the bottom. The water dispersion process in the column causes the petroleum products to evaporate out of the water and the air flowing upward counter-current to the water, picks up the evaporated humid petroleum vapor and takes it out at the top of the column. Thus, the water arriving at the bottom of the air stripper column is purified water having been stripped of dissolved petroleum products.

Thus, per FIG. 1, ground water is input into the air stripper 18 with a source of air 20 input below. The separated water goes to the bottom of the air stripper 18 above. If the water is sufficiently clean, to be determined at the site, the water is input into a charcoal filter unit 22 for further purification. If not, the separated water is input into the water reactor 16 for treatment with appropriate oxidizers such as ozone and/or hydrogen peroxide and then input into the charcoal filter unit 22.

The vapor from the air stripper 18, which contains most of the petrochemicals, is input into the vapor reactor 14 for reaction with oxidizers. After this step, the treated vapor is input into a scrubber 24 for treatment with a caustic solution before discharge into the air. The plant would have sources 26 and 28 of ozone and hydrogen peroxide therein.

The vapor reactor 14 provides for the vapor phase treatment of the gases being expelled out of the air stripper 18.

Figure 2:
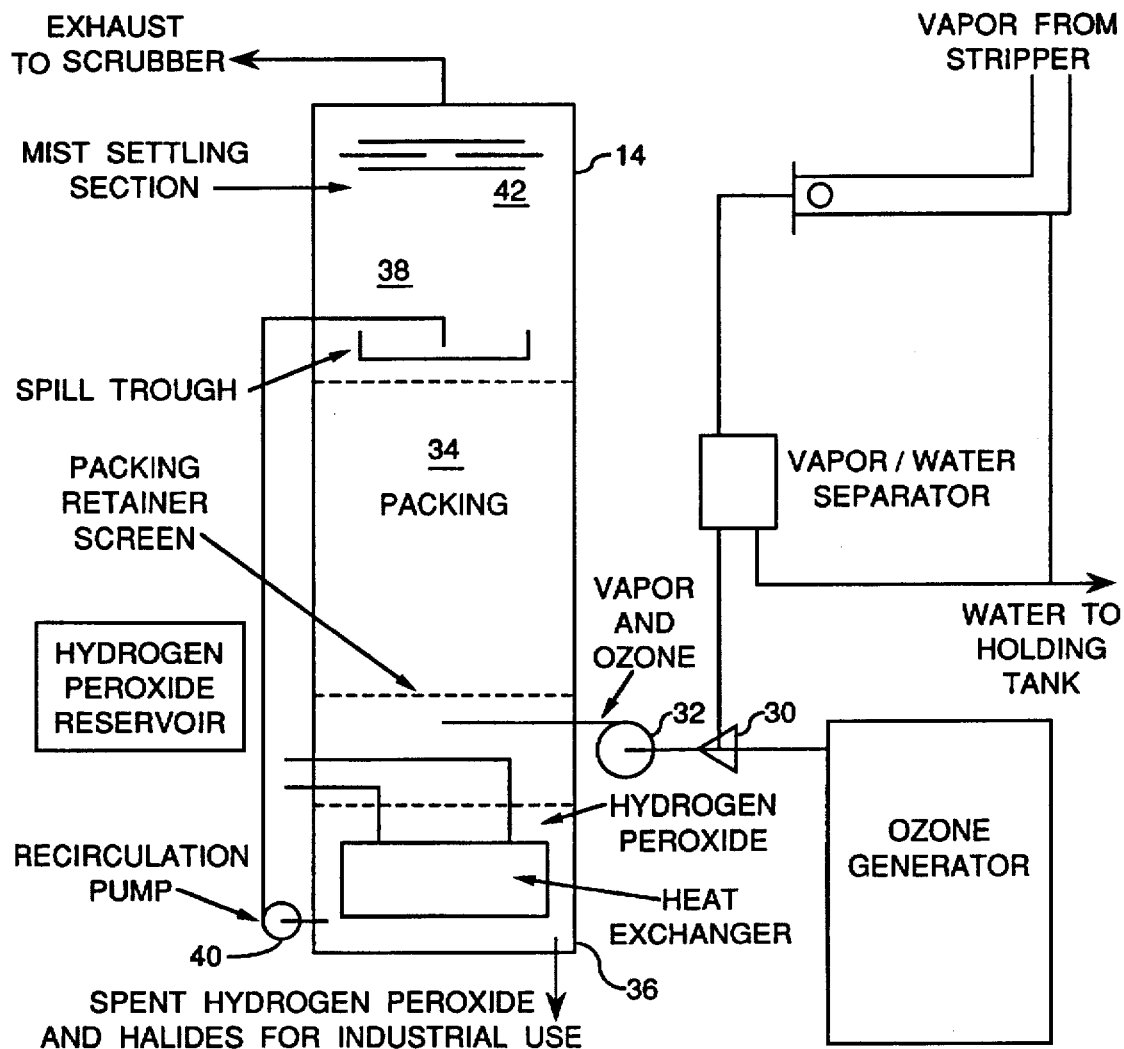
FIG. 2 is a schematic of a pilot test plant using the present invention.

These vapors contain gases of volatile contaminants. Referring in addition to FIG. 2, the vapors are mixed with ozone at mixer 30 and pumped by pump 32 into the reactor 14 where they are further scrubbed and oxidized in a packed column 34 in contact with high concentration hydrogen peroxide. The hydrogen peroxide flows downward through the packing column 34 while the ozone mixture is fed from the bottom of reactor 14. The combined effect of ozone and hydrogen peroxide serves as a powerful oxidizing medium. The hydrogen peroxide accumulated at the bottom 36 is pumped to the top 38 by a recirculation pump 40. The hydrogen peroxide is thus reused. This is different from the commercially available systems designed specifically for water treatment systems where low concentration Hydrogen Peroxide is added to water and is not recovered or recirculated for reuse. The present invention uses hydrogen peroxide in high concentrations, such as 30%, and is recirculated for optimum usage.

The water reactor 16 provides for liquid phase treatment. The water expelled from the bottom of the air stripper 18 is pumped into the water reactor 16 as shown in FIG. 1 where ozone gas is bubbled into the reactor together with low concentration hydrogen peroxide in order to decompose and oxidize the contaminants in the water. For low concentration contamination, such as 5 ppm, it may be possible to eliminate hydrogen peroxide and use ozone only because the air stripper 18 has already done a major part of the work and only a low energy system is necessary. Each plant would have to conduct pilot tests to determine whether to add this second reactor for water treatment and to eliminate the charcoal filter units 22 or to keep the charcoal units 22 and eliminate the need for this water treatment reactor 16. The valving shown in FIG. 1 provides for these various options.

Referring again to FIG. 1, the flow velocity of the mixture of ozone and vapor is critical inside the reactor 14 and should be kept sufficiently low to prevent the mist being blown out of the reactor 14 and to provide sufficient reaction residence time. This is discussed further in the examples below.

In FIG. 2, the vapor reactor 14 can be modified by feeding the ozone and vapor mixture from the top of the reactor instead of from the bottom. This concept provides a slower reaction rate. In this arrangement the flow of the hydrogen peroxide would be concurrent with the vapor and the mist settling section 42 would be at the bottom of the reactor.

An electronic control system, not shown, but considered conventional can be installed to measure and determine the amount of spent sump solution to be drained and the amount of fresh hydrogen peroxide to be replenished. The control system can sense the pH of the sump solution as carbon dioxide and halides in the solution increase causing the pH to drop progressively. Other suitable sensing devices may also be used.

EXAMPLE 1

The contaminated water containing petrochemicals being fed into the top of the air stripper 18 typically may contain 10 parts per million (ppm) of petrochemicals. Example of some of the contaminants are listed in Table 1 below.

TABLE I

Benzene
Bromochloromethane
Bromodichloromethane
Bramofoam
Bromomethane (Methyl Bromide)
Carbon Tetrachloride
Chlorobenzene
Chloroethane (Ethyl Chloride)
Chloromethane (Methyl Chloride)
2-Chloroethyl Vinyl Ether
Chloroform
Dibromochloromethane
1,2-Dichlorobenzene
1,3-Dichlorobenzene
1,4-Dichlorobenzene
Dichlorodifluoromethane
1,1-Dichloroethane
1,2-Dichloroethane (EDC)
Toluene
p-Bromofluorobenzeno
Acetone
2-Butanone (MEK)
4-Methyl-2-Pentanone (MIBK)

TABLE I CONT.

2-Hexanone
1,1-Dichloroethene
cis-1,2-Dichloroethene
trans-1,2-Dichloroethene
1,2-Dichloropropane
cis-1,3-Dichloropropene
trans-1,3-Dichloropropene
Dichlorotrifluoroethane
Ethylbenzene
Methylene Chloride
1,1,2,2-Tetrachloroethane
Tetrachloroethene (PCE)
1,1,1-Trichloroethane (TCA)
1,1,2-Trichloroethane
Trichloroethane (TCE)
Trichlorotrifluoroethane (F-113)
Trichlorofluoromethane (F-11)
Toluene
Vinyl Chloride
Xylenes, Total
1,2-Dichloroethane-d4

After being processed and concentrated into the vapor phase by the air stripper 18, the vapors exhausted at the top of the air stripper contain typically 40 ppm petrochemicals. The water exhausted at the bottom of the air stripper 18 contains 5 part per billion (ppb) of petrochemicals. Hence the air stripper 18 does the major part of the processing work.

In FIG. 1, the ozone fed to the water reactor 16 is typically 4% concentration using an ozone generator. Oxygen is provided to the generator from a molecular sieve which separates oxygen from air. The hydrogen peroxide fed into the reactor 18 is typically from a 30% source, but gets diluted to a low concentration such as 0.1% in the reactor. The feed ratio on a weight to weight basis of ozone to hydrogen peroxide is 4 to 1.

In FIG. 2, the ozone fed into the vapor reactor 14 is typically from a source of 4% concentration. The hydrogen peroxide fed into the reactor is typically from a 30% source, but can be operated at a diluted concentration, depending on the severity of the contaminants. The objective is to adapt the concentrations in the system to the extent of contamination of the contaminants and to minimize the usage concentration of hydrogen peroxide while maximizing the concentration and usage of ozone because of its lower cost. This variation and flexibility capability is superior to the capability of other systems which would need large capital outlays and complex systems.

The flow velocity of the ozone and vapor in the reactor 14 must be kept low to provide sufficient reaction residence time and to prevent the mist to be blown out of the reactor. For a flow rate of 1000 cubic feet per minute (CFM) of ozone and vapor being fed through duct 15 inches in diameter, the diameter of the vapor reactor 14 would be 6 feet to limit the velocity of the vapors traveling upward in the reactor 14 to approximately 1 foot per second or less.

For the packed section of the vapor reactor 14, the ratio of the height to diameter of the reactor 14 for the conditions given in this example has been calculated to be 3 to 1. For the mist settling section with the baffles the height to diameter ratio has been calculated to be 1 to 1. Because of the volatility tendency of Hydrogen Peroxide the drip down channels should be close to the packing.

The reaction in the vapor reactor 14 is:

Ozone+Hydrogen Peroxide+Halogenated Petrochemicals→Carbon Dioxide+Halides+Water The products of oxidation (right side of the equation) accumulate in the sump of the reactor 14 in the hydrogen peroxide solution. As the products of the reaction accumulate in the solution a small amount of the solution will be drained from the bottom of the sump as shown in FIG. 2 and sold for industrial use, such as, disinfection compound. Alternately, the solution can be processed on site to remove the carbon dioxide and halides and recycled. Depending on the specific requirements of the site the scrubber 24 can also be deactivated together with the incinerator.

EXAMPLE 2

The process mixture used in the vapor reactor 14 was also applied to soil contaminated with petrochemicals. By injecting ozone and hydrogen peroxide (or ozone first followed by hydrogen peroxide) into contaminated soil it was determined that the halogenated hydrocarbons decomposed into carbon dioxide and halides. Both of these products are innocuous and can be left in the soil. For treating of contaminants in underground soil, this process makes it unnecessary to use alternative expensive and energy intensive methods to remediate contamination.

EXAMPLE 3

The vapor reactor 14 described in FIG. 2 can also be used for soil vapor extraction systems where the vapors need to be vacuum extracted from the ground and be oxidized and remediated. Using this scheme the products will be contained and will not be exhausted into the atmosphere as pollutants.

EXAMPLE 4

To test for volatility of Hydrogen Peroxide, a 500 mL Erlenmeyer flask was filled 50 mL of 20% concentration hydrogen peroxide and vapors containing dilute petrochemicals were blown into the flask. Then the flask was capped with a rubber stopper. The vapors contained 10 ppm total of Trichloethylene, Benzene, Xylene and Toluene. The flask was shaken for one minute but no noticeable volatility nor effervescence was noticeable. This method may be used to determine if the mixtures or conditions being considered will produce a reaction with undesirable vigorous volatility.

Clearly, many modifications and variations of the present invention are possible in light of the above teachings and it is therefore understood, that within the inventive scope of the inventive concept, the invention may be practiced otherwise than specifically claimed.

What is claimed is:

1. A process for separating halogenated petrochemical contaminants from water comprising, a) passing said water through an air stripper as a water spray against an oncoming air flow to separate contaminants as vapors from said water, said air flow carrying off said vapors, b) passing said water from said air stripper to a water reactor and applying oxidizing agent thereto to oxidize at least some of the remaining contaminants in said water which agent is selected from the group consisting of ozone, hydrogen peroxide and a combination thereof and c) discharging the so-purified water.

2. The process of claim 8 wherein the water vapors are carried off from said air stripper and passed to a vapor reactor and oxidized with said oxidizing agent.

3. A process for treating as defined in claim 1 wherein said ozone is provided by a source of about 4% concentration and said hydrogen peroxide is provided by a source of about 30% concentration.

4. The process of claim 1 wherein the so discharged water is passed through a filter for further purification thereof.

* * * * *